US 6,708,081 B2

(12) United States Patent
Yoshida

(10) Patent No.: US 6,708,081 B2
(45) Date of Patent: Mar. 16, 2004

(54) ELECTRONIC EQUIPMENT WITH AN AUTONOMOUS FUNCTION

(75) Inventor: Makoto Yoshida, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 09/917,193

(22) Filed: Jul. 27, 2001

(65) Prior Publication Data

US 2002/0068995 A1 Jun. 6, 2002

(30) Foreign Application Priority Data

Jul. 27, 2000 (JP) ........................................ 2000-226286

(51) Int. Cl.[7] .............................................. G06F 19/00
(52) U.S. Cl. .................. 700/245; 700/31; 700/248; 700/258; 700/259; 318/568.1; 318/568.11; 318/568.2; 318/565; 318/569; 901/1; 901/15; 901/47; 704/207; 704/209; 704/270; 348/121
(58) Field of Search ......................... 700/31, 245, 248, 700/258, 259; 318/568.1, 568.11, 568.12, 568.2, 569, 565; 901/1, 15, 47; 704/207, 209, 270; 348/121

(56) References Cited

U.S. PATENT DOCUMENTS

| 4,657,104 A | * | 4/1987 | Holland ........................ 180/211 |
| 5,963,712 A | * | 10/1999 | Fujita et al. ............ 318/568.12 |
| 6,038,493 A | * | 3/2000 | Tow ............................. 700/259 |
| 6,058,385 A | * | 5/2000 | Koza et al. .................... 706/13 |
| 6,275,773 B1 | * | 8/2001 | Lemelson et al. .......... 340/436 |
| 6,321,140 B1 | * | 11/2001 | Fujita et al. ................. 250/253 |

OTHER PUBLICATIONS

Thrum et al., Probabilistic algorithms and the interactive museum tour–guide robot minerva, 2000, Internet, pp. 1–35.*
Breazeal et al., Infant–like social interactions between a robot and a human caregiver, 1998, Internet, p. 1–p. 44.*
Hara et al., Real–time facial interaction between human and 3D face robot agent, 1996, IEEE, pp. 401–409.*
Mizoguchi et al., Behavioral expression by an expressive mobile robot expressing vividness, mental distance, and attention, no date, pp. 306–311.*
Sony Electronics, Inc. AIBO, 200, Publication, p. 1.*

* cited by examiner

Primary Examiner—William A. Cuchlinski, Jr.
Assistant Examiner—McDieunel Marc
(74) Attorney, Agent, or Firm—Knobbe, Martens, Olson & Bear, LLP

(57) ABSTRACT

The invention is directed to electronic equipment, such as a pet robot, with an autonomous emotion-based function. The electronic equipment executes environment detection processing, emotion-production processing for producing an emotion, and movement determination processing for determining a movement based on the emotion. The movement determination processing is arranged such that actions representing the emotion by the movement of given parts of the pet robot are performed prior to main actions based on the emotion. Therefore, a user can understand the emotion of the pet robot by intuition and thereby predict the subsequent movement naturally and effectively, providing the user feeling that the movement of the pet robot is reasonable.

20 Claims, 6 Drawing Sheets

*Figure* 5 (a)
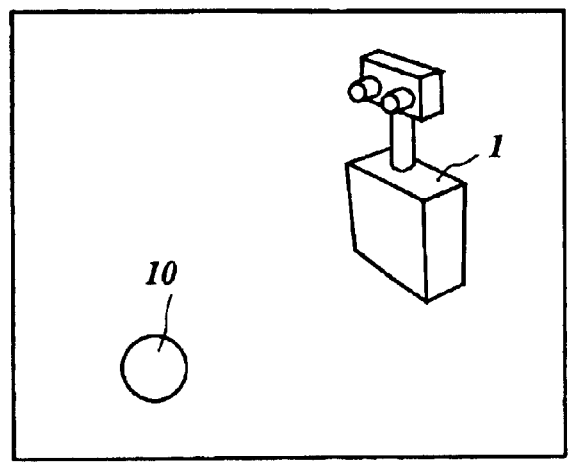
*Figure* 5 (b)
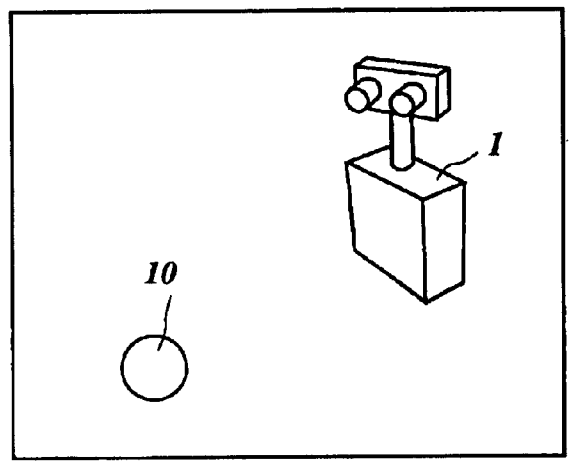
*Figure* 5 (c)
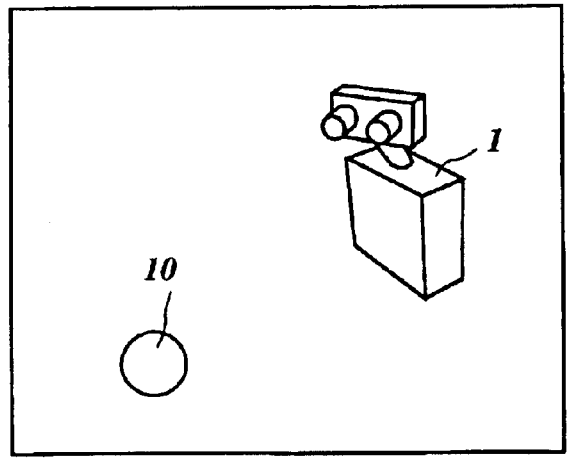

ELECTRONIC EQUIPMENT WITH AN AUTONOMOUS FUNCTION

REFERENCE TO RELATED APPLICATION

The present application claims foreign priority benefit of Japanese Application No. 2000-226286, filed Jul. 27, 2000, the contents of which is hereby incorporated by reference in its entirety.

BACKGROUND OF THE INVENTION

1. Field of the Invention

The present invention relates to electronic equipment that simulates emotion, and that determines a series of movements based on that emotion in a manner such that the movements appear to be normal and understandable.

2. Description of the Related Art

A conventional pet robot is a system in which information, such as surrounding situations or movements of a pet owner (a user of the pet robot), is acquired with an electronic camera or a microphone. Information about the owner is extracted from the acquired information by using image recognition devices or voice recognition devices. An emotion is produced based on the extracted information, and actions are determined based on the emotion.

However, if the robot's movement is determined and performed based on simply an emotion, as in the foregoing conventional pet robot, it is difficult for a user to understand the emotion by intuition. Therefore, the user often feels that the robot's movement is sudden and unexpected. Such problems are not limited to the case of pet robots, but are also found, for example, in other electronic pet devices or other electronic equipment with an autonomous function.

In view of the foregoing, there is a need for electronic equipment with an autonomous function in which a user is able to anticipate the movements of the equipment without thinking that something is amiss. In other words, there is a need for autonomous equipment that acts in a natural and understandable manner.

SUMMARY OF THE INVENTION

The present invention solves these and other problems by providing a method and an apparatus that operate autonomously, but in a manner that is predictable and understandable enough to satisfy a user that the equipment is operating properly. In one embodiment, the electronic equipment-type device includes an environment detection device for detecting surroundings; an emotion-production module for producing an emotion based, at least in part, on data provided by the detection device; and a movement determination module for determining movement based on the emotion produced by the emotion production module. In one embodiment, the movement-determination device determines the movement so that actions expressing emotion by movement of selected parts of the electronic equipment are performed prior to main actions based on the emotion.

Another aspect of the invention relates to a method of controlling movements of electronic equipment with an autonomous function based on an emotion to enable a user to generally predict the movements. The method comprises detecting an object outside of the electronic equipment; producing an emotion for the electronic equipment based on the detection of the object; determining movements of the electronic equipment based on the emotion; generating a control signal based on the detection of the object and the movements; and controlling the movements of the electronic equipment in response to the controlling signal.

Still another aspect of the invention relates to electronic equipment with an autonomous function for controlling movements thereof based on an emotion to enable a user to understand the movements with relative ease. The electronic equipment includes an object-detection device for detecting environment data including objects and surroundings; an emotion-production module that produces an emotion of the electronic equipment based on the environment data; a movement-determination module for determining movements of the electronic equipment based on the emotion; a control signal generator for generating a control signal based on the environment data and the movements; and a controlling device for controlling the movements of the electronic equipment in response to the controlling signal.

BRIEF DESCRIPTION OF THE DRAWINGS

These and other features of the invention will now be described with reference to the drawings summarized below. These drawings and the associated description are provided to illustrate preferred embodiments of the invention, and not to limit the scope of the invention.

FIG. 5 illustrates a series of movements for the pet robot, or other electronic device, corresponding to the emotions "like" and "dislike."

DETAILED DESCRIPTION

Figure 1:
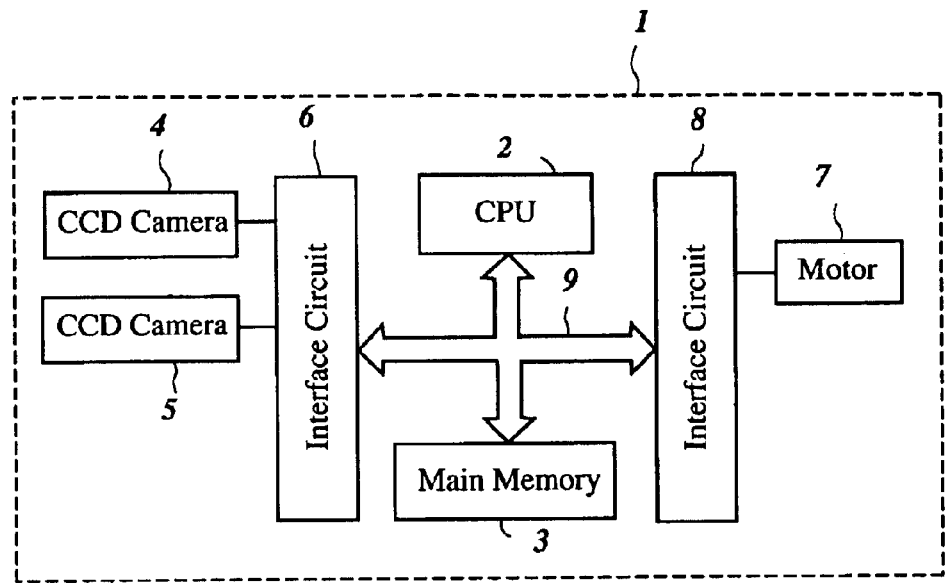
FIG. 1 is a block diagram showing the structure of a pet robot or other electronic device.

FIG. 1 is a schematic block diagram of one embodiment of a pet robot 1. The pet robot 1 includes a Central Processing Unit (CPU) 2, a main memory 3 for storing a program such as an OS or other requisite information, an interface circuit 6 for input devices such as an electronic camera 6 and an electronic camera 5, an interface circuit 8 for output devices such as a motor system 7, and a system bus 9 for connecting the CPU 2, the main memory 3 and the interface circuits 6 and 7. In one embodiment, the electronic camera 6 is an externally provided electronic camera 6 with a relatively wide field-of-view and a relatively low resolution and the electronic camera 5 is provided with a relatively narrow field-of-view and a relatively high resolution.

A user of the pet robot 1 starts a pet robot control program that is executed by timer interrupt processing on the CPU 2 at a control period of ΔT (for example, 10 msec).

Figure 2:
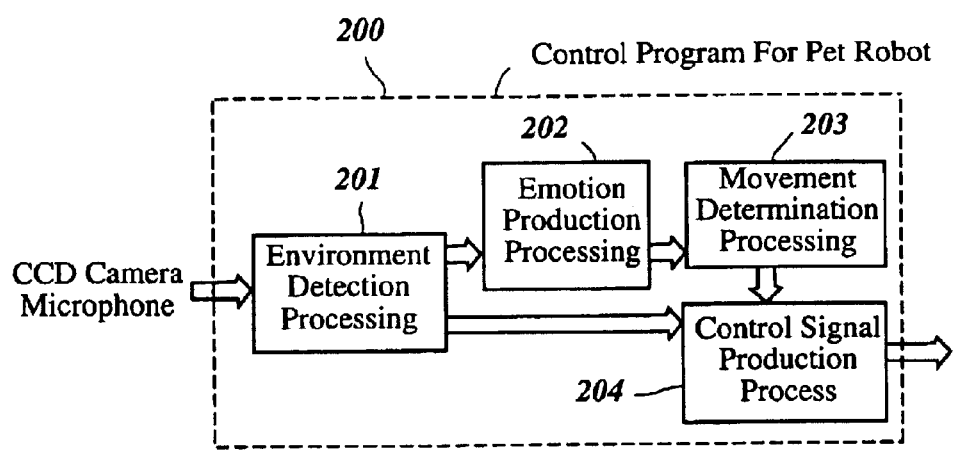
FIG. 2 is a block diagram showing processing of information in the pet robot or other electronic device.

FIG. 2 is a block diagram showing a pet robot control program 200 that includes an environment detection processing module 201 for detecting the user's movements and/or the robot's surroundings; an emotion-production module 202 for producing an emotion based at least in part on results provided by the environment-detection module 201; a movement-determination module 203 for determining a movement to be performed related to an emotion produced in the emotion-production module 202; and a control signal production module 204 for producing a control signal for use in performing one or more movements created by the movement determination module 203 and the results provided by the environment-detection module 201.

The environment-detection module 201 is adapted to detect several kinds of information on movements performed by a user for care of the pet robot, surrounding objects, and the ambient temperature, from data provided by the electronic cameras 4 and 5, and other available sensors (for example, temperature sensors).

The emotion-production module 202 is adapted to produce emotions of the pet robot 1 based on the detection result of the environment detection module 201, using formulas for calculating parameters expressing emotions. The emotions of the pet robot 1 include, for example, "anger," "sadness," "pleasure," "fear," "surprise," "like," and "dislike." In one embodiment, the kind of emotion the robot has at present is expressed by the magnitude of the parameters corresponding to the respective emotions.

The movement-determination module 203 is adapted to determine a movement referring to parameters expressing emotions calculated in the emotion-production module 202. The movements of the pet robot 1 include, for example, "bite," "bark," "run," "cry," and "sleep," which are specified by the lower and upper limits of the respective parameters representing the movements. For example, the movement of "bite" is determined when a parameter representing "anger" has a value of 90–100 and a parameter representing "sadness" a value of 0–20.

The control-signal production module 204 is adapted to produce a control signal through which a movement determined in the movement-determination module 203 is performed. The control signal is provided to a motor system 7 for driving member components corresponding to hands (or paws), legs, a body, a head, etc.

Figure 3:
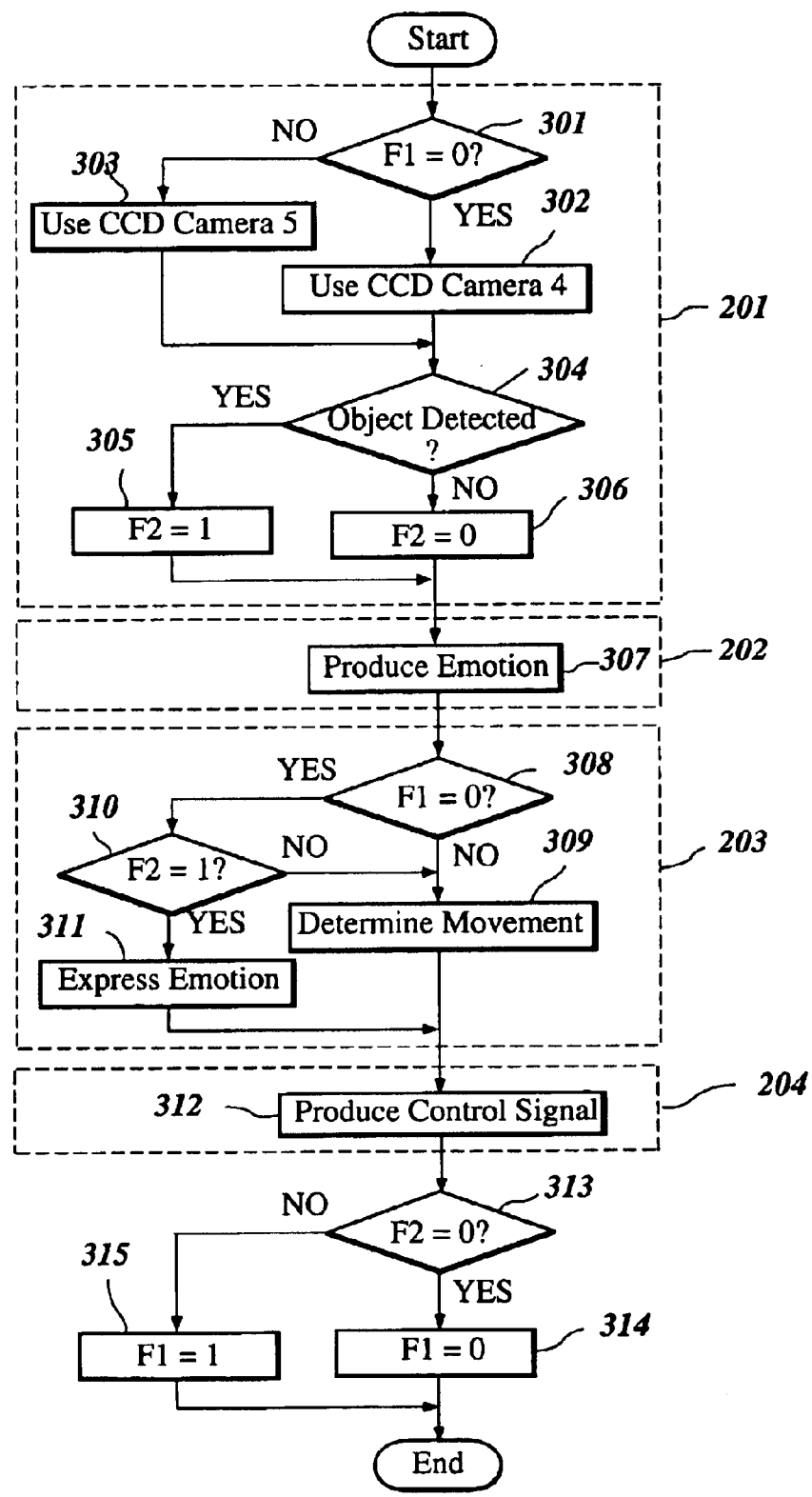
FIG. 3 is a flowchart of a pet robot control program.

FIG. 3 is a flowchart showing a general procedure of the pet robot control program 200. As shown in FIG. 3, Steps 301–306 correspond to the environment detection module 201. First, at Step 301, it is determined whether or not a camera selection flag F1 has been set to a reset state of "0", that is, a condition under which the image information of the electronic camera 4 with a relatively wide field-of-view and a relatively low resolution is used. If the flag F1 is in a reset state, the procedure proceeds to Step 302, where the electronic camera 4 is used. If the flag is not in a reset state, the procedure proceeds to Step 303, where the image information of the electronic camera 5 with a relatively narrow field-of-view and a relatively high resolution is used.

At Step 302, image information is acquired using the electronic camera 4, and the procedure proceeds to Step 304 after searching for a given object based on the acquired image information. Otherwise, at Step 303, image information is acquired using the electronic camera 5. The procedure proceeds to Step 304 after searching for a given object based on the acquired image information. At Step 304, it is determined whether or not a given object is detected at Step 302 or Step 303. If the given object is detected, the procedure proceeds to Step 305, where an object detection flag F2 is set to "1." If the given object is not detected, the procedure proceeds to Step 306, where the object detection flag F2 is reset to "0," and then to Step 307.

Step 307 corresponds to the emotion-production module 202. At Step 307, an emotion of the pet robot 1 is produced, based on the detection result of Step 302 or Step 303. Then, the procedure proceeds to Step 308.

Steps 308–311 correspond to the movement-determination module 203. First, at Step 308, it is determined whether or not the camera selection flag F1 is "0," that is, the image information acquired using the electronic camera 4 was used. If the determination of Step 308 is "NO," the procedure proceeds to Step 309. If the determination of Step 308 is "YES," the procedure proceeds to Step 310, where it is determined whether or not the object detection flag F2 is "1," that is, whether an object was seen by the electronic camera 4. If the determination of Step 310 is "NO," the procedure proceeds to Step 9, where actions are determined, based on the emotion produced at Step 307, and thereafter to Step 312. Otherwise, if the determination of Step 310 is "YES," the procedure proceeds to Step 11, where a routine is executed for representing the emotion of the pet robot 1 produced at Step 307, and thereafter to Step 312.

Figure 4:
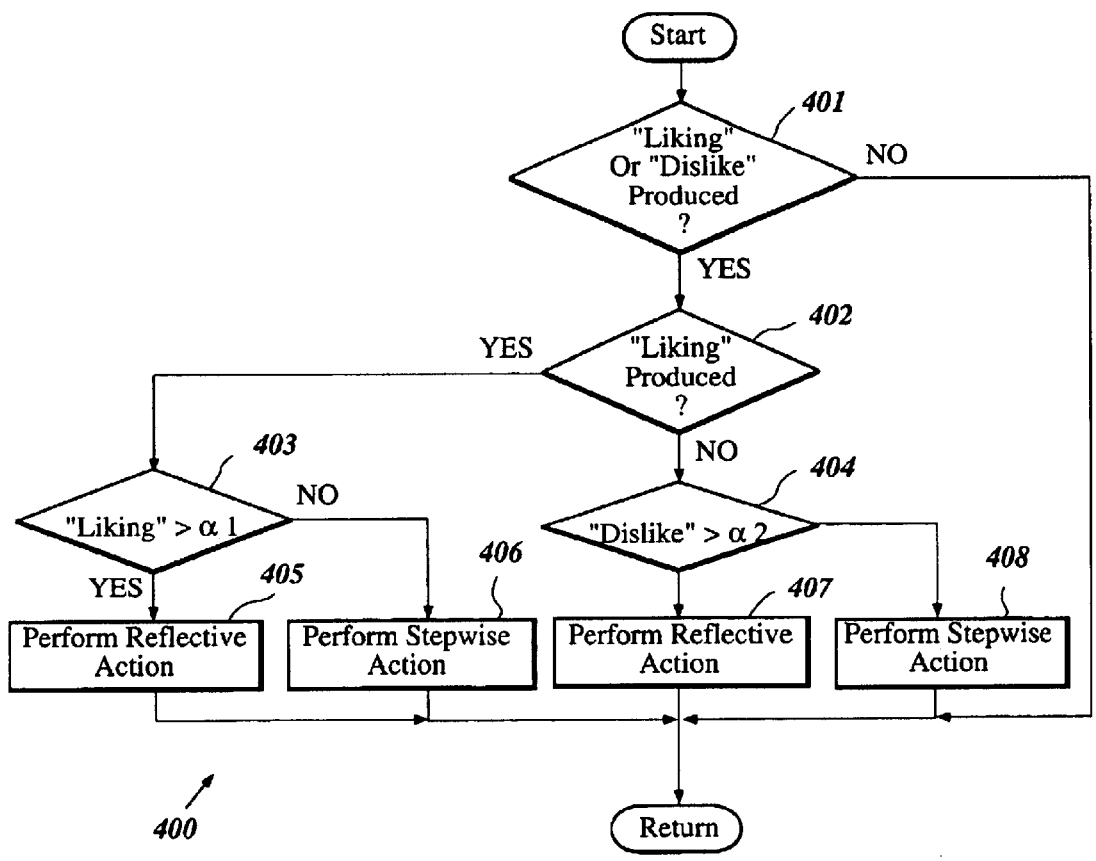
FIG. 4 is a flowchart of a routine for determining actions representing emotions.

FIG. 4 is a flowchart showing a routine 400 for determining actions representing an emotion. The routine 400 determines first, at Step 401, whether or not an emotion of "like" or "dislike" is produced. If the determination of Step 401 is "NO," the emotion representation processing is completed directly and the procedure returns to the main program. If the determination of Step 401 is "YES," the procedure proceeds to Step 402, where it is determined whether or not the emotion of "like" is produced. If the determination is "YES," the procedure proceeds to Step 403. If the determination is "NO," the procedure proceeds to Step 404.

At Step 403, it is determined whether or not the magnitude of a parameter representing the emotion of "like" is larger than a given threshold $\alpha 1$. If the parameter representing the emotion of "like" is larger than the given threshold $\alpha 1$, then the procedure proceeds to Step 405, where it is determined that reflective actions representing the emotion of "like" are performed. If, however, the parameter representing the emotion of "like" is smaller than the given threshold $\alpha 1$, the procedure proceeds to Step 406, where it is determined that stepwise actions representing the emotion of "like" are performed and then returns to the main program.

In one embodiment, an emotion having a value less than the given threshold will produce relatively more gradual movements, and an emotion having a value greater than the given threshold will produce relatively sharper movements.

At Step 404, it is determined whether or not the magnitude of a parameter representing the emotion of "dislike" is larger than a given threshold $\alpha 2$. If the parameter representing the emotion of "dislike" is larger than the given threshold $\alpha 2$, then the procedure proceeds to Step 407, where it is determined that reflective actions representing the emotion of "dislike" are performed. If, on the contrary, it is not, the procedure proceeds to Step 408, where it is determined that stepwise actions representing the emotion of "dislike" are performed, and then returns to the main program.

Step 312 corresponds to the control signal production module 204. At Step 312, a control signal, which is to be sent to the motor system 7, for a determined movement is produced based on the detection result of Step 302 or Step 303. Then, the procedure proceeds to Step 313.

Steps 313–315 are the processing for updating the camera selection flag F1. At Step 313, it is determined whether or not the object detection flag F2 is in a reset state, that is, a condition under which a given object has been detected. If the determination is "YES," the camera selection flag F1 is reset to "0" so that image information of the electronic camera 4 with a relatively wide field-of-view and a relatively low resolution is used at the time of execution of the next program. If the determination is "NO," the camera selection flag F2 is set to "1" so that the electronic camera 5 with a relatively narrow field-of-view and a relatively high resolution is used at the time of execution of the next program.

If a user of the pet robot 1 has just started the pet robot control program, the camera selection flag F1 is in a reset state of "0." Therefore, the procedure proceeds to Step 302, where a given object is searched using image information acquired by the electronic camera 4 with a relatively wide field-of-view and a relatively low resolution.

Thus, if the given detection object has not been detected, rough detection of the surroundings is performed by searching a relatively wide area at a time, thereby providing a quick wide area searching. If an object has been detected, the determination of Step 304 is "YES," and thus, the object detection flag F2 is "1." Thereafter, if the determination of "YES" at Step 308 is followed by the determination "YES" at Step 310, a routine is executed at Step 311 for determining actions representing an emotion.

FIGS. 5(a), (b), and (c) show a series of movements by the pet robot 1 when it takes a liking to a sphere 10. Assuming that the object detected by the pet robot 1 is the sphere 10 and the pet robot 1 likes the sphere 10, the determination of both Step 401 and Step 402 is "YES," and the procedure proceeds to Step 403. If the parameter expressing an emotion of "like" is no larger than a given threshold $\alpha 1$, the determination of Step 403 is "NO," and the procedure proceeds to Step 406, where it is determined that stepwise actions are taken for representing the emotion of "like." The pet robot 1, first, as shown in FIG. 5(a), drives the portion of the motor system 7 that controls the field of view of the electronic cameras 4 and 5, to capture the sphere 10 at the center of the visual field. Then, the pet robot 1, as shown in FIG. 5(b), also drives the portion of the motor system 7 connected to the joint in the base of the face, to direct the face toward the sphere 10 to place the sphere 10 near the center of the visual field. Further, the pet robot 1, as shown in FIG. 5(c), also drives the portion of the motor system 7 connected to the joints on both upper and lower sides of the neck, to push the face forward with the sphere 10 being captured at the center of its visual field. That is, actions of pushing the face forward correspond to actions showing the emotion of "like."

If, however, the parameter expressing an emotion of "like" is larger than the given threshold $\alpha 1$, the determination of Step 403 is "YES." Then, the procedure proceeds to Step 405, where it is determined that reflective actions are taken for expressing the emotion of "liking." The pet robot 1 is adapted to perform the foregoing stepwise actions of Step 403.

Figure 6:
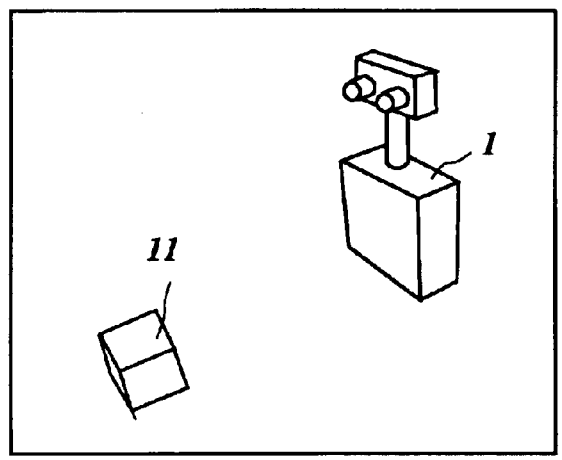
FIG. 6 illustrates a further series of movements corresponding to the "dislike" emotion.
Figure 6:
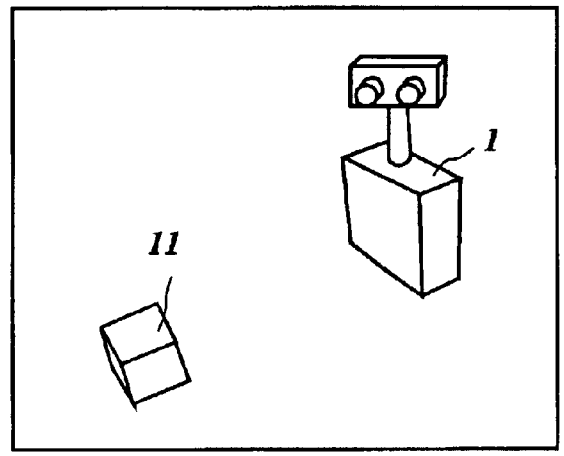
Figure 6:
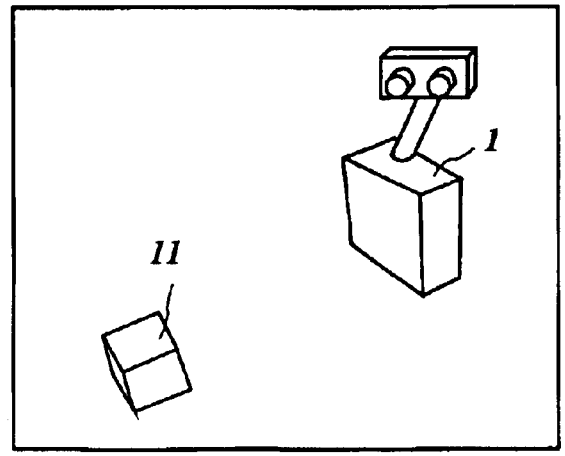

FIGS. 6(a), (b), and (c) show a series of movements by the pet robot 1 when it takes a dislike to a cube 11. Assuming that the object detected by the pet robot 1 is the cube 11 and that the pet robot 1 dislikes the cube 11, the determination of Step 401 is "YES," that of Step 402 is "NO," and the procedure proceeds to Step 404.

If the parameter expressing an emotion of "dislike" is no larger than a given threshold $\alpha 2$, the determination of Step 404 is "NO" that leads to Step 408, where it is determined that stepwise actions are taken for displaying the emotion of "dislike." The pet robot 1, first, as shown in FIG. 6(a), drives the portion of the motor system 7 connected to the electronic cameras 4 and 5, to eliminate the cube 11 from the center of its visual field. Then, the pet robot 1, as shown in FIG. 6(b), also drives the portion of the motor system 7 connected to the joint in the base of the face, to turn the face away from the cube 11. Further, the pet robot 1, as shown in FIG. 6(c), also drives the portion of the motor system 7 connected to the joints on both upper and lower sides of the neck, to turn the face away from the cube 11. That is, actions of turning the face away correspond to actions showing the emotion of "dislike." On the other hand, if the parameter expressing an emotion of "dislike" is larger than the given threshold $\alpha 2$, the determination of Step 404 is "YES," and the procedure proceeds to Step 407, where it is determined that reflective actions are performed for displaying the emotion of "dislike." The pet robot 1 is adapted to perform the foregoing stepwise actions of Step 408.

Thus, actions showing an emotion by the movement of given parts such as eyes and a neck of the pet robot 1 are performed prior to actions based on the emotion. As a result, a user is able to understand the emotion of the pet robot 1 by intuition and to thereby predict the subsequent movement naturally and effectively, providing the user a feeling that the movement of the pet robot 1 is reasonable.

At Step 312, a control signal for the actions determined at Step 309 or Step 311 is produced, based on the detection result of Step 302. The control signal is then sent to the motor system 7 disposed at several sections of the pet robot 1, so that actions showing an emotion of the pet robot 1 are actually performed. Since an object has been detected, the determination of Step 313 is "NO." The procedure proceeds to Step 315, where the camera selection flag F1 is set to "1," and the main program is completed.

Assuming that after a given control period $\Delta T$, the pet robot control program is restarted while the pet robot is performing reflective or stepwise actions, then, since the camera selection flag F1 was set to "1" at the time of the previous execution of the program, the determination of Step 301 is "NO." The procedure proceeds to Step 303, where an object is detected based on the image information acquired by the electronic camera 5 with a relatively narrow field-of-view and a relatively high resolution. Since the determination of Step 308 is "NO," actions are determined based on the foregoing emotion produced at Step 309.

Thus, when an object has been detected, actions representing an emotion are performed, as well as a specific (e.g., more detailed) examination of the object and/or surroundings, using environment detection data and information, and providing main actions based on the specific examination results.

The foregoing is not intended to limit the kinds of emotions to be expressed, and a method of expressing emotions. Although an example has been shown in which electronic equipment with an autonomous function according to the present invention is applied to a pet robot, the present invention is not limited to the pet robot, but may also be applied to other electronic pet devices, including simulators, game machines, etc.

The foregoing disclosure shows a plurality of imaging devices with different fields of view and resolutions including an environment detection device (e.g., the electronic cameras 4 and 5), and an image recognition module for detecting a given object based on the image captured by the electronic cameras 4 and 5. The electronic camera 4 with a relatively wide field-of-view and a relatively low resolution is used when looking for an object (e.g., in a search mode), and the electronic camera with a relatively narrow field-of-view and a relatively high resolution is used when the given object has been detected (e.g., in a detailed examination mode).

Figure 7:
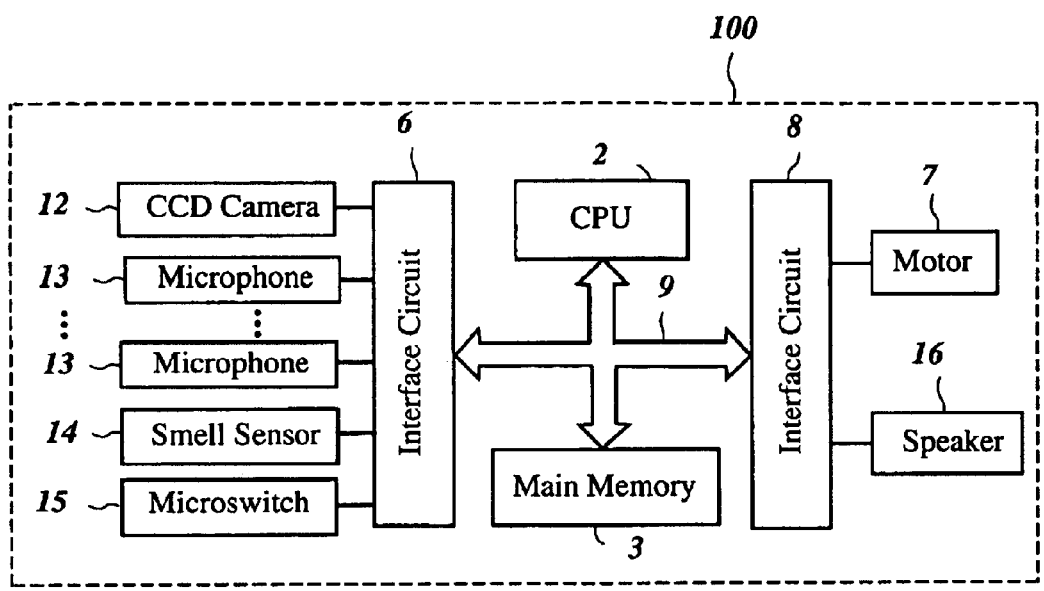
FIG. 7 is a schematic block diagram showing the structure of a pet robot or other electronic device having more types of sensors than the structure shown in FIG. 1.

FIG. 7 is a block diagram showing a pet robot 700 that provides more types of input devices than the pet robot 1 shown in FIG. 1. The robot 700 includes the interface 6, the CPU 2, the memory 3, and the motor system 7. The robot 700 also includes an electronic camera 12 with a zoom function as an environment detection device, and an image recognition module for detecting a given object based on the image captured by the electronic camera 12. The electronic camera 12 can be used in a zoom-out mode when looking for an object, and the electronic camera 12 can be used in a zoom-in mode when the given object has been detected.

Further, the robot 700 includes one or more voice collection devices such as an acoustic environment detection device, such as a microphone 13; a voice recognition module for detecting a given voice based on the voice data collected by the microphone 13; a sound source detection module for detecting a sound source based on the given voice detected by the voice recognition module; an imaging device such as an electronic camera 12; and an image recognition module for detecting a given object based on the image obtained by the electronic camera 12. One skilled in the art will recognize that the functions of voice recognition and image recognition can also be performed by the CPU 2 using data from the microphone 13 and the electronic camera 12, respectively. The electronic camera 12 can be directed toward the sound source detected by the sound source detection device. The microphone 13 is able to search a larger area than the electronic camera 12, so that more objects can be detected.

In one embodiment, an odor collection device, such as an odor sensor 14, is also provided. Odors are recognized by an odor recognition module for detecting a given odor based on the odor collected by the odor sensor 14, or by using processing in the CPU 2 to process data from the odor sensor 14. The robot 7 can also, optionally, include an odor source detection device for detecting the source of a given odor. The electronic camera 12 can be directed toward the source of the odor.

In one embodiment, a tactile sensation detection device such as a micro-switch 15 is also provided. The electronic camera 12 can be pointed in a direction detected by the micro-switch 15.

When an object has been detected through the foregoing wide area search instead of using a plurality of environment detection device, the environment detection device can be pointed in a direction that provides additional (or better) data about the object and/or the surroundings. For example, there can be provided a voice collection device with a relatively higher directivity as the environment detection device (such as a microphone with relatively higher directivity), and a voice recognition module for detecting a given voice based on the voice collected by the microphone 13. The microphone 13 can be pointed in a direction in which the voice of the given object can be detected relatively clearly.

In one embodiment, an odor collection device such as the odor sensor 14 and an odor recognition module are used for detecting a given odor based on the data collected by the odor sensor 14. The odor sensor 14 can be pointed in a direction in which the given odor can be detected relatively clearly.

In one embodiment, a plurality of voice collection devices (e.g. microphones) are provided along with a voice recognition module for detecting a given voice based on the data collected by the microphones. In one embodiment a sound source detection module is provided for detecting a sound source based on the given voice detected by the voice recognition module. The microphone 13 can be directed toward the sound source detected by the sound source detection device.

In the movement determination module described above, an example has been shown in which the parts of the pet robot 1 such as eyes, a face and a neck thereof are moved by the motor system 7 to express the emotion. Other parts of the pet robot 1 such as hands or legs may be moved by the motor system 7. That is, an emotion of "like" may be expressed, for example, by raising both of its hands, and that of "dislike" may be shown by covering its eyes with both of its hands.

In addition, the pet robots 1 and/or 700 can be provided with a speaker 16, and a voice showing an emotion can be voiced by the speaker along with the movement of the parts such as eyes, a face and a neck. For example, when an emotion of "like" is displayed by the movement of given parts, the "voice of pleasure" can be emitted from the speaker 15. When the emotion of "dislike" is shown by the movement of given parts, the "voice of surprise" can be emitted from the speaker 16. Thereby allowing the user to understand the emotion of the pet robot 1 more intuitively.

Further, where parts used for actions showing the emotion of the pet robot 1 are different from parts used for main actions based on the emotion, the main actions can be performed while the actions showing the emotion are being performed. For example, while actions displaying the emotion of "like" are being performed by moving parts such as eyes, a face and a neck, main actions can be performed using parts such as hands and legs that are not in use for actions showing the emotion of "like." Although, in the foregoing embodiment, examples have been shown in which emotions of "like" and "dislike" are expressed, the present invention is not intended to limit the emotion to be expressed.

When an object has not been detected, rough detection can be performed on the surroundings using environment detection device capable of searching a relatively wide area. After an object has been detected, actions showing an emotion based on the rough detection result of the surroundings can be performed, as well as a specific detection of the surroundings using an environment detection device capable of detecting specific information, thus providing main actions based on the specific detection result.

For example, there may be provided, as the environment detection device, a plurality of imaging devices with different fields of view and different resolutions, and an image recognition module for detecting an object based on the image captured by the imaging device. When an object is to be detected, an imaging device with a relatively wide field-of-view and a relatively low resolution can be employed. When an object has been detected, an imaging device with a narrower field of view and a higher resolution can be used to provide further data about the object.

In one embodiment, the environment detection device includes an imaging device having a zoom function and an image recognition module for detecting a given object based on the image captured by the imaging device. When the given object is to be detected, the imaging device can be used on the zoom-out mode. When the given object has been detected, the imaging device can be used on the zoom-in mode.

In one embodiment the environment detection device includes a plurality of voice collection devices and a voice recognition module for detecting a given voice based on the data collected by the voice collection device. Since the voice collection device is able to search a relatively wider area than the imaging device, more objects can potentially be detected.

In one embodiment, the environment detection device include an odor collection device; an odor recognition module for detecting a given odor based on the odor collected by the odor collection device; and, optionally, an odor source detection device for detecting the source of the odor.

In one embodiment, the environment detection device includes a tactile sensation detection device. The imaging device can be pointed in the direction detected by the tactile sensation detection device.

In one embodiment, instead of using a plurality of environment detection devices, the environment detection device can be pointed in a direction in which relatively clear information can be detected, for detailed detection of the surroundings, when an object has been detected as a result of the wide area searching.

In one embodiment, the environment detection device includes a voice collection device with a high directivity and a voice recognition module for detecting a given voice based on the voice collected by the voice collection device. The voice collection device can be pointed in a direction in which the voice of the given object can be detected relatively clearly.

In one embodiment, the environment detection device includes, an odor collection device and an odor recognition module for detecting a given odor based on the odor collected by the odor collection device. The odor recognition module can be pointed in a direction in which the given odor can be detected relatively clearly.

In one embodiment, the environment detection device includes a plurality of voice collection devices; a voice recognition module for detecting a given voice based on the voice collected by the voice collection module; and a sound source detection device for detecting sound source based on the given voice detected by the voice recognition module.

Since a movement is determined such that when the level of an emotion exceeds a predetermined threshold, reflective actions are performed instead of actions representing the emotion, it is possible for a user to understand more intuitively the emotion of the electronic equipment with an autonomous function and to understand and predict the subsequent movement, thereby providing a user the feeling that the movement of the electronic equipment with an autonomous function is reasonable.

As described above, actions displaying the emotion by the movement of given parts of the electronic equipment are performed prior to main actions based on the emotion, a user can understand the emotion of the electronic equipment with an autonomous function by intuition and predict the subsequent movement naturally and effectively. This provides the user feeling that the movement of the electronic equipment with an autonomous function is reasonable.

Although described above in connection with the particular embodiments of the present invention, it should be understood that the descriptions of the embodiments are illustrative of the invention and are not intended to be limiting. Various modifications and applications may occur to those skilled in the art without departing from the true spirit and scope of the invention as defined in the appended claims.

What is claimed is:

1. A pet robot-type of device with an autonomous emotion-based function, comprising:
   an environment detection device for detecting surroundings;
   an emotion-production module for producing an emotion based at least in part on data from the environment detection device; and
   a movement-determination module for determining a movement based on the emotion produced by the emotion-production module, wherein the movement determination module determines the movement so that actions expressing the emotion by movements of given parts of the device are performed prior to main actions based on the emotion, wherein a speed of movement of portions of the device are moved relatively more gradually in response to relatively weaker emotions and relatively more Quickly in response to relatively stronger emotions.

2. The pet robot-type of device of claim 1, wherein the movement determination module determines the movement so that when the produced emotion exceeds a predetermined threshold, reflective actions are performed instead of actions expressing the emotion.

3. A method of controlling movements of electronic equipment with an autonomous function based on a simulated emotion, the method comprising:
   detecting an object;
   producing an emotion based at least in part on the detected object;
   determining movements of the electronic equipment based on the emotion;
   generating a control signal based on the object and the movements; and
   producing one or more motions of the electronic equipment in response to the controlling signal, wherein a speed of movement of portions of the electronic equipment are moved relatively more gradually in response to relatively weaker emotions and relatively more quickly in response to relatively stronger emotions.

4. The method of claim 3, wherein said determining movements of the electronic equipment is performed so that when a predetermined emotion is below a specified threshold, predetermined parts of the electronic equipment are moved relatively gradually to express the emotion.

5. The method of claim 4, wherein the predetermined emotion comprises like or dislike.

6. The method of claim 4, wherein the predetermined parts of the electronic equipment comprise at least one of a face, an eye, a neck, a hand, and a leg.

7. The method of claim 3, wherein said determining movements of the electronic equipment is performed so that when a predetermined emotion is above a specified threshold, parts of the electronic equipment are moved relatively sharply.

8. The method of claim 3 A method of controlling movements of electronic equipment with an autonomous function based on a simulated emotion, the method comprising:
   detecting an object;
   producing an emotion based at least in part on the detected object;
   determining movements of the electronic equipment based on the emotion;
   generating a control signal based on the object and the movements; and
   producing one or more motions of the electronic equipment in response to the controlling signal, wherein said detecting an object includes searching in a relatively wide field-of-view and at a relatively lower resolution when looking for an object, and then searching in a relatively narrow field-of-view and a relatively higher resolution when the object has been found.

9. The method of claim 3, wherein said detecting an object includes collecting images.

10. A method of controlling movements of electronic equipment with an autonomous function based on a simulated emotion, the method comprising:
  detecting an object;
  producing an emotion based at least in part on the detected object;
  determining movements of the electronic equipment based on the emotion;
  generating a control signal based on the object and the movements; and
  producing one or more motions of the electronic equipment in response to the controlling signal, wherein said detecting an object includes a relatively rough search of the surroundings when the object has not been found, and then searching a specific region of the surroundings when the object has been found.

11. A method of controlling movements of electronic equipment with an autonomous function based on a simulated emotion, the method comprising:
  detecting an object;
  producing an emotion based at least in part on the detected object;
  determining movements of the electronic equipment based on the emotion;
  generating a control signal based on the object and the movements; and
  producing one or more motions of the electronic equipment in response to the controlling signal, wherein said detecting an object includes collecting sounds.

12. A method of controlling movements of electronic equipment with an autonomous function based on a simulated emotion, the method comprising:
  detecting an object;
  producing an emotion based at least in part on the detected object;
  determining movements of the electronic equipment based on the emotion;
  generating a control signal based on the object and the movements; and
  producing one or more motions of the electronic equipment in response to the controlling signal, wherein said detecting an object includes collecting odors.

13. A method of controlling movements of electronic equipment with an autonomous function based on a simulated emotion, the method comprising:
  detecting an object;
  producing an emotion based at least in part on the detected object;
  determining movements of the electronic equipment based on the emotion;
  generating a control signal based on the object and the movements; and
  producing one or more motions of the electronic equipment in response to the controlling signal, wherein said detecting an object includes collecting tactile senses.

14. An apparatus with emotion-based movements, comprising:
  an object detection device for detecting an object;
  an emotion-production module producing an emotion of the apparatus based on the detected object;
  a movement-determination module for determining movements of the apparatus based on the production of the emotion;
  a control signal generation module for generating a control signal based on the detected object and the determination of the movements of the apparatus; and
  a controlling device for controlling the movements of the apparatus in response to the controlling signal, wherein a speed of movement of portions of the apparatus are moved relatively more gradually in response to relatively weaker emotions and relatively more quickly in response to relatively stronger emotions.

15. The electronic equipment of claim 14, wherein the movement determination module operates so that when a predetermined emotion is below a specified threshold, predetermined parts of the electronic equipment are moved relatively gradually to express the emotion.

16. The electronic equipment of claim 14, wherein the movement determination module operates so that when a predetermined emotion is above a specified threshold, predetermined parts of the electronic equipment are moved relatively sharply to express the emotion.

17. An apparatus with emotion-based movements, comprising:
  an object detection device for detecting an object;
  an emotion-production module producing an emotion of the apparatus based on the detected object;
  a movement-determination module for determining movements of the apparatus based on the production of the emotion;
  a control signal generation module for generating a control signal based on the detected object and the determination of the movements of the apparatus; and
  a controlling device for controlling the movements of the apparatus in response to the controlling signal, wherein the object detection device is configured to perform a relatively low-resolution search to find an object, perform actions showing an emotion based on the relatively low-resolution search, and perform a relatively higher resolution examination of the object that has been found.

18. An apparatus with emotion-based movements, comprising:
  an object detection device for detecting an object;
  an emotion-production module producing an emotion of the apparatus based on the detected object;
  a movement-determination module for determining movements of the apparatus based on the production of the emotion;
  a control signal generation module for generating a control signal based on the detected object and the determination of the movements of the apparatus; and
  a controlling device for controlling the movements of the apparatus in response to the controlling signal, wherein the object detection device includes at least one imaging device having an adjustable field of view, the imaging device having a relatively wide field-of-view and a relatively lower resolution for use when looking for an object, and the imaging device having a relatively narrow field-of-view and a relatively higher resolution for use when an object has been found.

19. An apparatus with emotion-based movements, comprising:
  an object detection device for detecting an object;
  an emotion-production module producing an emotion of the apparatus based on the detected object;
  a movement-determination module for determining movements of the apparatus based on the production of the emotion;

a control signal generation module for generating a control signal based on the detected object and the determination of the movements of the apparatus; and a controlling device for controlling the movements of the apparatus in response to the controlling signal, wherein the object detection device includes a plurality of sound collection devices.

20. An apparatus with emotion-based movements, comprising:

an object detection device for detecting an object;

an emotion-production module producing an emotion of the apparatus based on the detected object;

a movement-determination module for determining movements of the apparatus based on the production of the emotion;

a control signal generation module for generating a control signal based on the detected object and the determination of the movements of the apparatus; and a controlling device for controlling the movements of the apparatus in response to the controlling signal, wherein the object detection device includes at least one odor collection device.

* * * * *

UNITED STATES PATENT AND TRADEMARK OFFICE
CERTIFICATE OF CORRECTION

PATENT NO. : 6,708,081 B2
DATED : March 16, 2004
INVENTOR(S) : Makoto Yoshida

It is certified that error appears in the above-identified patent and that said Letters Patent is hereby corrected as shown below:

<u>Column 10,</u>
Line 10, change "Quickly" to -- quickly --.

Signed and Sealed this

Eighth Day of March, 2005

JON W. DUDAS
*Director of the United States Patent and Trademark Office*